Aug. 1, 1967    R. W. BOSSE    3,333,613

INSERT DRIVER DEVICE

Filed March 7, 1966    3 Sheets-Sheet 1

INVENTOR
ROBERT W. BOSSE

BY
*Arch B Colvin*
ATTORNEY

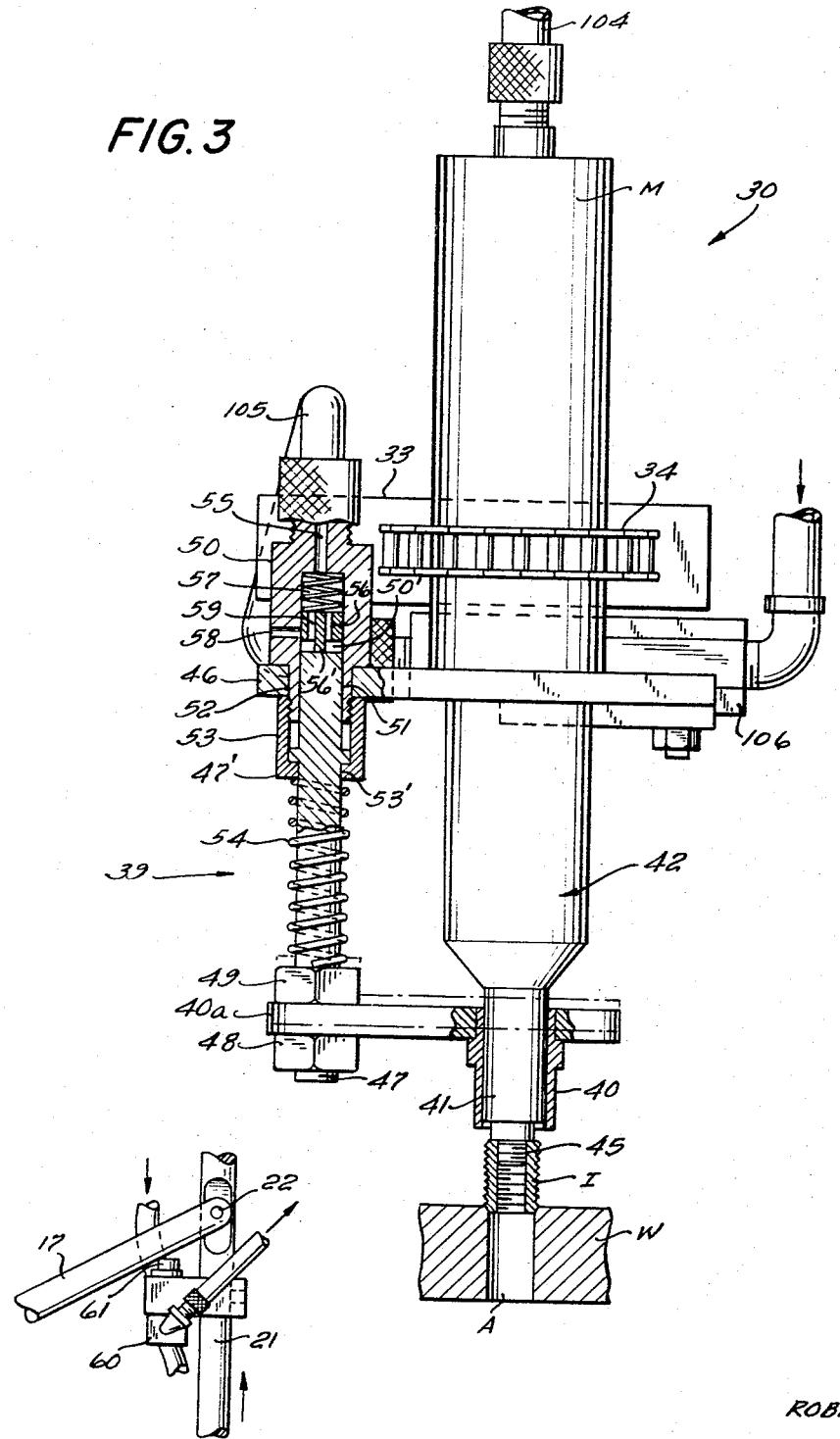

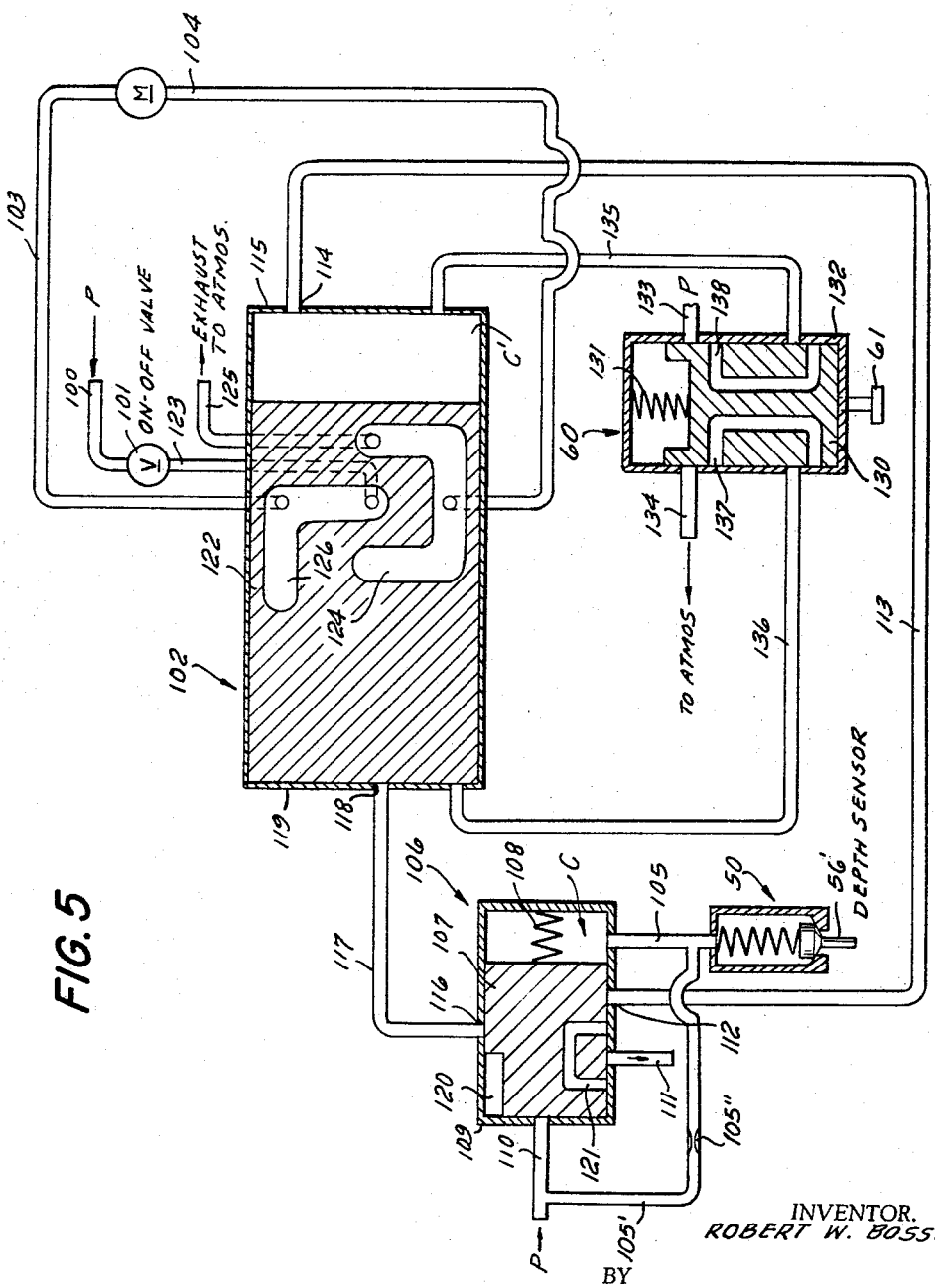

United States Patent Office 3,333,613
Patented Aug. 1, 1967

3,333,613
INSERT DRIVER DEVICE
Robert W. Bosse, Englewood Cliffs, N.J., assignor to Groov-Pin Corporation, Ridgefield, N.J., a corporation of New York
Filed Mar. 7, 1966, Ser. No. 532,175
4 Claims. (Cl. 144—32)

This invention relates to an insert driver device, and more particularly to a device for automatically applying inserts into wood, plastic, aluminum or other relatively soft material.

As is well known, an insert generally comprises an annular metallic member of steel for example, having internal and external threads. Where it is desired to thread a bolt or screw into a workpiece of such material, it is known practice to first thread a metallic insert into an aperture formed therein so that the insert will receive the screw rather than threading the screw into the material itself, thus avoiding the necessity for stressing the threaded portions of the relatively soft workpiece and avoiding the likelihood of stripping such threads.

While the present invention is directed primarily to hollow annular insert members, it will be readily recognized that the invention should be sufficiently broadly construed to relate to inserts of the type wherein a threaded stud is driven into the relatively soft workpiece and a projecting threaded metallic portion is used for the subsequent attachment of articles thereto.

With the foregoing in mind, it is an object of the invention to provide a device for automatically driving inserts into a workpiece.

A further object of the invention is to provide a device for automatically driving inserts of the type described, wherein affixation of the insert in a direction precisely normal to the surface of the article is assured.

A further object of the invention is the provision of an automatic insert driver device, whereby the device is initially set in motion and lowered to effect the desired implanting of an insert, the apparatus automatically reversing to back the device clear of connection with the implanted insert, the device further automatically again reversing the direction of drive when the same reaches an elevated position, thus to be capable of receiving a further insert in position for driving.

According to the invention, these objects are accomplished by the arrangement and combination of elements hereinafter described and more particularly recited in the claims.

Figure 1:
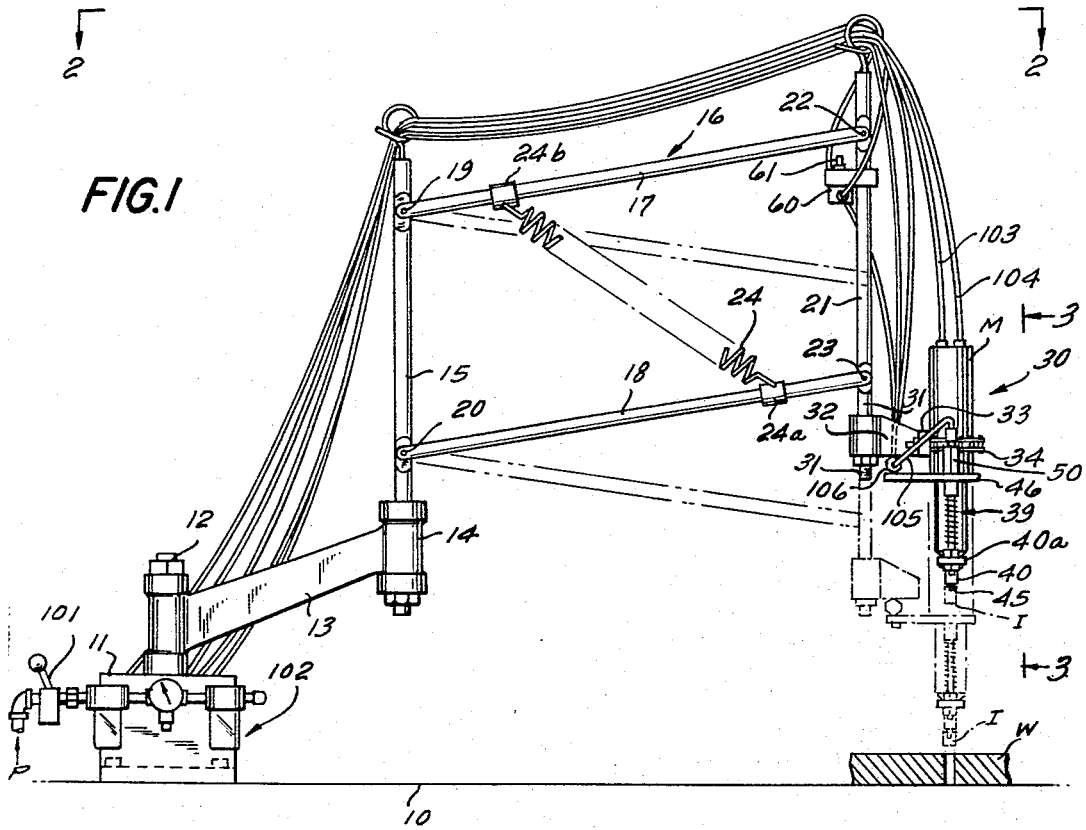
Figure 2:
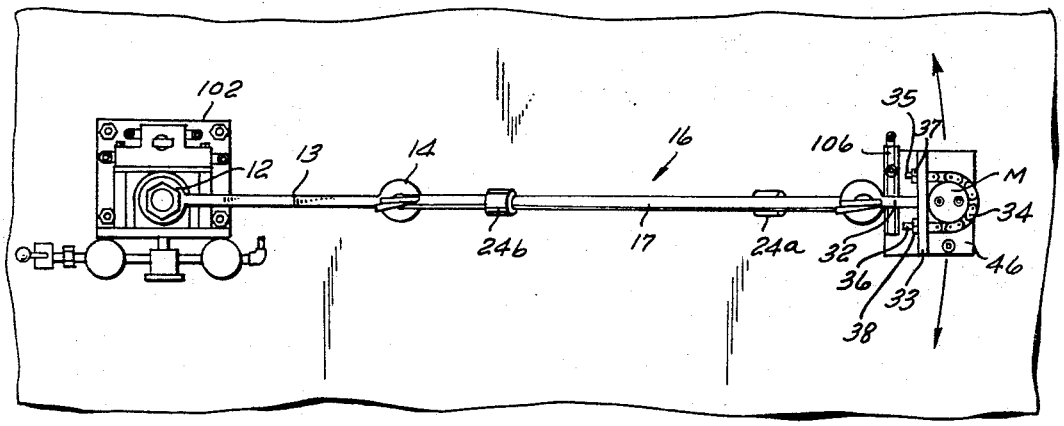

In the accompanying drawings in which is shown one of various possible embodiments of the several features of the invention, FIG. 1 is a side elevational view of an automatic insert driver device in accordance with the invention, FIG. 2 is a plan view of the device of FIG. 1, FIG. 3 is a magnified front view of the driver mechanism, showing the position of the parts ready to drive an insert, FIG. 4 is a fragmentary side elevational view of the reversing mechanism in accordance with the invention in the fully raised position of the insert driver, and FIG. 5 is a schematic circuit of the automatic drive device.

Referring now to the drawings, there is shown in FIG. 1 a support base 10, to which is fixedly mounted a support member 11 carrying a swivel post 12. To the post 12 an extension leg 13 is pivotally mounted for swinging movement in a horizontal plane. The leg 13 includes at its outer end an extended boss 14, having an interior bushing within which is rotatably mounted a vertically directed support arm 15 of a frame 16 generally in the form of a pantograph.

The pantograph frame is defined, in addition to the arm 15, by spaced reach arms 17, 18, pivotally connected to the arm 15 at spaced points 19 and 20 respectively. A motor support arm 21 is provided with pivotal connections 22, 23, spaced apart to correspond with the spacing of the pivots 19 and 20, the arm 17 being connected to the pivot 22 and the arm 18 to the pivot 23.

As will be readily understood, the aforementioned frame may be articulated upwardly and downwardly, and in all articulated positions the motor support arm 21 will remain parallel to the arm 15.

A counter balance spring 24 is tensioned between the reach arms 17 and 18, the spring being directed downwardly and forwardly, serving to counter balance the weight of the motor assembly, next to be described, which is carried on the motor support arm 21. Optionally, but preferably, the spring 24 at its opposite ends, is connected to adjustable collars 24a, 24b, respectively, which collars may be slid longitudinally of the reach arms 17 and 18, thus to supply a variable counter balancing force. Lock means, not shown, may be employed to fix the collars 24a, 24b at any desired position along the reach arms.

A drive motor assembly 30 is carried at a position adjacent the lower end 31 of the motor support arm 21. The assembly includes a bracket arm 32 extending laterally from the arm 21, the bracket arm carrying a drive motor M adjacent its outer end. Preferably, the motor M is of the reversible, air driven type, a suitable drive motor or gun being manufactured by the Ingersoll-Rand Corporation. The operation of the gun forms no part of the present invention and it should be understood that, within the scope of the appended claims, the invention is to be broadly interpreted as encompassing either air or electric drive mechanisms which are reversible in their operation.

The bracket 32 includes a transversely directed support bar 33 provided with an aperture at each end. The motor M is supported on the bracket by a chain 34, the ends of which are provided with threaded studs 35, 36 passing through the spaced apertures in bar 33. Lock nuts 37, 38, threaded over the studs 35, 36, respectively, draw the chain tightly about the housing of the motor M securely to mount the latter on the bracket 32.

It will be readily recognized that the aforementioned arrangement permits the motor to be released from its mounted position for adjustment, repair and so forth.

A depth sensing mechanism 39 (FIG. 3) is secured to the drive motor assembly 30, operating to trigger a control valve in the manner hereinafter more particularly set forth, and thus effect reversal of the motor drive direction.

As best seen in FIGS. 1 and 3, the depth sensing mechanism includes a collar 40 surrounding the reduced diameter lower end 41 of the rotatable mandrel 42 of the drive motor. As will be clear from the views, and particularly FIG. 3, the collar 40 and its offset bracket arm 40a which is rigid therewith, are free to move upwardly and downwardly, as shown in broken lines in FIG. 3 on the lower end 41 of the spindle.

The motor assembly 30 includes a transversely directed bracket arm 46 in spaced parallel relation to the offset arm 40a. Stem member 47 extends upwardly from the arm 40a, the heightwise position of the stem being adjustable through the use of stem adjustment nuts 48, 49. A relief valve 50 is mounted on bracket arm 46 and has a threaded lower end 51 extending through an opening 52 in arm 46 to which a cup-shaped retaining cap 53 is secured. The stem member 47 extends through an opening 53' in the cap 53 into the bore 50' of the relief valve 50, an annular flange 47' rigid with the stem 47 limiting its downward movement in the cap 53. A coil spring 54 is biased between cap 53 and adjustment nut 49 normally to urge the arm 40a downwardly.

The valve 50 has a passageway 55 at its upper end leading into the larger diameter bore 50'. A piston 56 is slidably mounted in bore 55 and has a stud 56' protruding from its undersurface against which the inner end of stem 47 reacts. The piston 56 is normally biased downwardly by a coil spring 57 and will normally close vent passageway 58. The piston has passageways 59 therethrough to provide communication between passageways 55 and 58 when the piston 56 is moved upwardly in the manner hereinafter described.

From the foregoing it will be readily recognized that when the collar 40 and its associated offset bracket arm 40a are moved upwardly, the stem 51 will also be moved upwardly. As a result, the piston 59 will be lifted so that passageway 58 will be in communication with vent passageway 62 through piston passageway 63.

The depth sensing valve arrangement just described is for illustrative purposes only and variations of this arrangement may be readily developed by the skilled worker.

An impulse valve 60 is mounted on the motor support arm 21, the valve 60 being secured at a position adjacent the upper reach arm 17 of the pantograph frame 16. The valve 60 includes a release stem 61 which is disposed vertically beneath the reach arm 17. As best seen in FIG. 4, upon upward movement of the pantograph assembly to a predetermined height, the reach arm 17 will engage and depress the stem 61, for purposes hereafter set forth.

Next to be described is the operating circuit of the device. Referring particularly to FIG. 5, a source of air under pressure is applied in the conduit 100 through "On-Off" valve 101, for energizing the system and for driving the motor.

When the circuit is initially energized by actuating the valve 101, it will be seen that the pressure end of the system is connected through four-way valve 102 to conduit 103 leading to one of the two motor connections. The other conduit 104, leading from the motor, is connected through the valve 102 to the atmosphere by conduit 125.

From the foregoing, it will be recognized that since the pressure is applied through conduit 103, the motor will be driven in a first direction. The positions of the parts in FIG. 5 correspond to the initial position of the device when an insert is to be applied, the arm 17 being normally spaced from the release stem 61. That is to say, an insert I is received on the threaded end 45 of mandrel 42 which is rotating clockwise or in insert driving direction. The operator will thereupon lower the insert into a desired position in an aperture A formed in the workpiece W, as seen in FIG. 3. The insert will be progressively driven into the material of the workpiece by the rotating mandrel until the lower end of the collar 40 engages the upper surface of the workpiece at which time further entry of the insert into the workpiece W will cause the collar 40 to be moved upwardly.

When the collar 40, its associated bracket arm 40a and stem 47 are shifted upwardly relative to the motor a sufficient distance as determined by the position of the adjustment stem 47, the piston 56 of the valve 50 will be moved upwardly to open vent passageway 58 thus connecting one end of conduit 105 to atmosphere. The other end of conduit 105 is connected to the chamber C formed at the closed end of booster valve 106, the booster valve including a shiftable spool 107 biased by spring 108 toward the end 109 of the valve. In addition, conduit 105 is connected by conduit 105' through restrictor 105'' to conduit 110.

The end 109 of the valve 106 is normally under pressure applied through conduit 110. However, as the pressure on both ends of spool 107 is balanced due to conduit 105', the force of the spring 108 in chamber C is sufficient to maintain the spool 107 in the left hand position shown in FIG. 5. With the opening of valve 50 to the atmosphere by upward movement of piston 56, there will be a sudden drop in the pressure in the chamber C so that the pressure in conduit 110 will be sufficient to shift the spool 107 to the right, referring to FIG. 5, against the force of spring 108.

The valve 106 incorporates an exhaust port 111 open to the atmosphere. A spaced port 112 of valve 106 is connected by conduit 113 to a port 114 in one end 115 of the four-way valve 102. The valve 106 includes, in addition, a further pressure port 116, connected through the conduit 117 to a port 118 at the opposite end 119 of the four-way valve 102.

The spool 107 of the valve 106 includes a first by-pass passage 120 which, when the spool is shifted sufficiently to the right, connects the pressure conduit 110 with the conduit 117. Similarly, a bypass groove 121, upon the shifting to the right of the spool 107 connects conduit 113 to the exhaust port 111 leading to the atmosphere.

From the foregoing, it will be readily understood that the movement of the piston 56 results in a temporary shifting to the right of the spool 107, the shifting of the spool, in turn, connecting conduit 117 to the air under pressure and conduit 113 to the atmosphere.

As a result of this connection, the spool 112 of four-way valve 102 will be shifted to the right from the position shown in FIG. 5. As a result of the right hand shifting of the spool 122, the pressure in conduit 123 will be directed into bypass groove 124 in the valve spool 122. Similarly, the exhaust connection of conduit 125 will, as a result of such shifting movement, be connected to the bypass groove 126 of spool 122.

It will be observed that conduit 103 to the motor is at all times in communication with bypass groove 126 and conduit 104 is at all times in communication with groove 124. Thus, as a net result of the shifting to the right of the spool 122, pressure will be applied to the motor through conduit 104 and conduit 103 will be communicated to the atmosphere, thus reversing the direction of rotation of the motor M.

Due to the high coefficient of friction between the insert and the workpiece into which it has been driven, the reversal of the motor will result in a backing of the threaded mandrel 41 out of the internal threads of the insert, thus clearing the mandrel from any connection with the now driven insert. It will be noted that the motor is now rotating in a direction reverse to the direction necessary for attachment of a further insert to the mandrel and driving of such insert. As a result, the collar 40 will be moved downwardly by spring 54 and the stem 47 will also move downwardly to close exhaust port 58 to close valve 50. Consequently, the pressure in chamber C will build up to equal that reacting against the left end of spool 107 so that spring 108 will move spool 107 to the left hand position shown.

A re-reversal of the direction of rotation is automatically effected by the insert driver apparatus of the present invention. This re-reversal is done by the operator by lifting the arm 21 to the fully raised position shown in FIG. 4, at which time the valve stem 61 of impulse valve 60 is tripped or depressed by engagement with the reach arm 17.

The valve 60 incorporates a spool 130 normally pressed downwardly or toward end 132 of the valve. Conduit 133 leading to valve 60 is at all times connected to the pressure source, with conduit 134 being at all times connected to the atmosphere.

Conduit 135 extends from valve 60 to the right hand end 115 of the spool chamber C' in four-way valve 102. Similarly, conduit 136 extends from the valve to the opposite end 119 of the valve.

Normally, the pressure conduit 133 is isolated from conduit 135 and exhaust conduit 134 is isolated from conduit 136. However, when the stem 61 of the valve is pressed inwardly by upward movement of the pantograph frame, the spool 130 will be shifted upwardly in the valve 60, the groove 137 thus connecting conduit 136 with conduit 134 and the groove 138 connecting conduit 135 with conduit 133.

It will be observed that through the connections aforesaid, the spool 122 of the four-way valve will be shifted in an opposite direction, thus to re-establish the initial position of the valve as shown in FIG. 5.

From the foregoing, it will be seen that, in operation, the motor is automatically reversed to rotate in a driving direction when the pantograph linkage is in its raised position. With the motor thus rotating, an insert may be readily mounted on the mandrel by moving the internally threaded portion of the insert into engagement with the mandrel. The operator then merely lowers the frame to direct the insert into the desired aperture in the workpiece. When the depth sensing mechanism is depressed by the driving of the insert to the desired depth in the workpiece, valve 50 is actuated, in turn actuating the booster valve 106 and in turn, shifting the spool of the four-way valve 102 to effect reverse rotation of the drive motor.

As previously noted, the mandrel will be backed off from the insert, leaving the insert in the desired position, the subsequent lifting of the frame by the operator again reversing the direction of rotation of the motor, to permit rapid application of another insert.

As many changes could be made in the above equipment, and many apparently widely different embodiments of this invention could be made without departing from the scope of the claims, it is intended that all matter contained in the above description or shown in the accompanying drawings shall be interpreted as illustrative and not in a limiting sense.

Having thus described my invention, what I claim as new and desire to secure by Letters Patent of the United States is:

1. A device for automatically driving threaded inserts into an aperture in a workpiece comprising a support, an articulatable carriage mounted on said support, said carriage being shiftable toward and away from a work surface on which the workpiece is positioned, said carriage comprising a pantograph frame having a vertical support arm mounted on said support for pivotal movement about a vertical axis, parallel spaced reach arms pivotally mounted to said support arm for movement in a vertical plane, a motor support arm pivotally connected to the ends of said reach arms, adjustable counterbalance spring means biased between a pair of said arms, a reversible motor means mounted on said motor support arm to be shiftable toward and away from said surface, a mandrel depending from said motor means and having a threaded portion complemental to the threading of said insert, means for actuating said motor means, comprising first motor direction control means on said motor support arm including an actuator abutment disposed in the path of one of said reach arms and responsive to predetermined upward movement of said reach arms and support arms whereby said abutment is depressed when said reach arms attain a predetermined angular relation with respect to said support arms for shifting the rotation of said motor to an insert driving direction, and second motor direction control means on said carriage for reversing the direction of rotation of said motor means responsive to movement of said carriage to a predetermined distance from said work surface.

2. A device in accordance with claim 1 wherein said second motor control means includes an abutment portion shiftable by engagement with said workpiece, the engagement of said last named parts being effective to reverse the direction of rotation of said motor means.

3. A device in accordance with claim 2 in which said abutment portion is carried by said motor means and includes a slidable member and a valve controlled by movement of said slidable member controls the reversal of said motor means.

4. A device in accordance with claim 1 wherein said motor means is air operated, said device including a four-way, air reversing valve, said valve including a reversing spool shiftable between first and second positions, and wherein said first control means comprises an actuator valve for shifting said spool to one said position, and said second control means comprises a second valve for shifting said spool to said second position.

References Cited

UNITED STATES PATENTS

| | | |
|---|---|---|
| 1,189,754 | 7/1916 | Trenaman. |
| 1,732,038 | 10/1929 | Connell. |
| 1,754,978 | 4/1930 | Buss _____ 144—32 |
| 2,323,488 | 7/1943 | Schauex. |
| 2,390,524 | 12/1945 | Eckener. |
| 2,830,310 | 4/1958 | Smith. |
| 2,880,770 | 4/1959 | Ettinger _____ 144—32 |

FOREIGN PATENTS 531,300   10/1956   Canada.

WILLIAM W. DYER, Jr., *Primary Examiner.*

R. J. ZLOTNIK, *Assistant Examiner.*